(12) United States Patent
Liu et al.

(10) Patent No.: US 10,446,190 B1
(45) Date of Patent: Oct. 15, 2019

(54) FAST IMAGE SEQUENCING

(71) Applicant: Chin-Min Liu, Zhubei (TW)

(72) Inventors: Chin-Min Liu, Zhubei (TW);
Hsueh-Chih Liu, Zhubei (TW);
Yu-Tung Liu, Taipei (TW); Pei-Yu Liu, Taipei (TW)

(73) Assignee: Chin-Min Liu, Zhubei, Hsinchu County (TW)

( * ) Notice: Subject to any disclaimer, the term of this patent is extended or adjusted under 35 U.S.C. 154(b) by 61 days.

(21) Appl. No.: 15/963,295

(22) Filed: Apr. 26, 2018

(51) Int. Cl.
*G11B 27/036* (2006.01)
*G11B 27/22* (2006.01)
*G06F 16/58* (2019.01)

(52) U.S. Cl.
CPC ........ *G11B 27/036* (2013.01); *G06F 16/5866* (2019.01); *G11B 27/22* (2013.01)

(58) Field of Classification Search
CPC .... G11B 27/036; G11B 27/02; G06F 16/5866
See application file for complete search history.

(56) References Cited

U.S. PATENT DOCUMENTS

2011/0050706 A1* 3/2011 Cherna ................ G06T 11/60
345/441
2017/0053169 A1* 2/2017 Cuban ................ H04N 7/185

* cited by examiner

*Primary Examiner* — Thai Q Tran
*Assistant Examiner* — Jose M Mesa
(74) *Attorney, Agent, or Firm* — Rosenberg, Klein & Lee

(57) ABSTRACT

The present invention proposes a fast image sequencing method, which comprises steps: defining a motion path merely via picking up a plurality of pieces of captured image information and the sequence of thereof; searching a database for the exemplary images within a specified distance from a first piece of captured image positioning information in the motion path; picking up a next piece of captured image positioning information and searching for exemplary images until none next piece of captured image positioning information is found; sending back the selected exemplary images to a user's device and presenting the exemplary images in a periphery of the sequence of the captured images. Thereby, the user can view the images and interpolate the exemplary images into the sequence of the captured images. The present invention can search for images and send back the selected images for edition merely using the capture image information.

11 Claims, 10 Drawing Sheets captured images exemplary images

FAST IMAGE SEQUENCING

BACKGROUND OF THE INVENTION

Field of the Invention

The present invention relates to an image processing method, particularly to a fast image sequencing method, which can search external devices for images and send back the images to the user's device for assisting in personal image edition.

Description of the Related Art

With continuous evolution of science and technology, electronic devices with a photographing function are growing more and more popular. Even a common communication device has a built-in camera. Besides, most of the current camera devices have a positioning function. While the user takes photographs, the sites of photographing are also recorded. While the user reviews the photographs taken in tours, he may also learn the photographing sites recorded by the built-in positioning function.

After tours, a user may arrange and sort the photographs taken in his tours and integrates these photographs into a video functioning as a documentary film of his tours. At present, many mobile phone applications, such Moments of Facebook and Quick of Go Pro, allow the user to select the files inside the mobile phone for fast editing the images and integrating the images into a video file. While there are insufficient images in the user's device, the user may manually search for related images through the Internet, add the selected images to the images captured in tours, and then arrange and sequence the images, to enrich the contents of the video. However, manually searching for external images or manually editing the images from the user's device and external devices is very time-consuming. Besides, the handheld devices have small screens. Undertaking precise search and comparison in a small touchscreen is a challenge for the user. The normal process thereof includes downloading external files, sequencing the images according to time, sites, file names, or specified marks, and then selecting the images, which is a troublesome matter for the user of a handheld device. Therefore, it is desired by users to fast edit images and enrich the contents of videos. Thus, the present invention proposes a fast image sequencing method to overcome the abovementioned problems.

SUMMARY OF THE INVENTION

The primary objective of the present invention is to provide a fast image sequencing method, which is exempted from picking up contents of images but merely picks up a plurality of pieces of the Exchangeable Image File Format (EXIF) information of captured images and the sequence information of the captured images from the user's device, and which searches external databases for related images to enrich a personally-made video. The present invention can save the user a lot of time spent in complicated image edition. The EXIF information used by the present invention has a smaller file size. Therefore, the present invention can reduce the amount of information transmission and prevent from leakage of user's personal images.

Another objective of the present invention is to provide a fast image sequencing method, which can automatically select Unmanned Aerial Vehicle (UAV) images corresponding to the positioning information of the EXIF information of captured images, and which transmits back the selected UAV images and presents the UAV images in the periphery of the captured images, whereby the user can interpolate the selected UAV images into the sequence of the captured images to generate an integrated video, whereby the present invention can enrich the images and make the integrated video played more smooth.

In order to achieve the abovementioned objectives, the present invention proposes a fast image sequencing method, which comprises steps: picking up a plurality of pieces of captured image information of a plurality of captured images and a sequence of the plurality of pieces of the captured image information from a device; defining a motion path according to the sequence information of the plurality of pieces of the captured image information; picking up a first piece of captured image information in the motion path; determining whether the captured image information has a piece of captured image positioning information; if no, picking up the next piece of captured image information, and returning to the step of determining whether the captured image information has a piece of captured image positioning information; if yes, picking up the piece of captured image positioning information, and proceeding to the next step; searching a database to determine whether there is at least one exemplary image within a specified distance from the captured image positioning information; if no, picking up the next piece of captured image information, and returning to the step of determining whether the captured image information has a piece of captured image positioning information; if yes, picking up the exemplary image, and arranging the exemplary image to be adjacent to the captured image information, and then proceeding to the next step; determining whether there is a next piece of captured image information; if yes, picking up the next piece of captured image information, and returning to the step of determining whether the captured image information has a piece of captured image positioning information; if no, sending back the exemplary images and the sequence information of the exemplary images and the captured image information to the device. The exemplary images are presented in the periphery of the captured images on the display interface of the device. The user visually checks the captured images and the exemplary images, interpolates the selected exemplary images into the corresponding captured images, and then fabricates the sequence of captured images and exemplary images into an integrated video. Therefore, the present invention needn't output the graphic contents of the captured images. The present invention can search external devices and send back the selected images for edition merely using the captured image information and the captured image positioning information. The present invention can increase the speed of editing images and enrich the contents of images. Further, the present invention can prevent from leakage of personal images.

After the step of picking up the exemplary image and arranging the exemplary image to be adjacent to the captured image information, the method of the present invention further comprises steps: comparing the exemplary image time information with the captured image time information to pick up the exemplary images within a specified interval from the captured image time information; comparing the exemplary image size information with the captured image size information to select the exemplary images meeting the captured image size information; according to the exemplary image positioning information of the selected exemplary images, determining whether the exemplary image falls into a circular region whose diameter is the distance between one piece of captured image positioning information and the next piece of captured image positioning information; if no, selecting the circular region most near the exemplary image and interposing the exemplary image between two pieces of captured image positioning information most near the circular region; if yes, determining whether the exemplary image also falls into another circular region at the same time according to the exemplary image positioning information of the exemplary image; if yes, selecting a circular region whose center is most near the exemplary image and interposing the exemplary image between two pieces of captured image information, which generate the circular region; if no, selecting the circular region which the exemplary image falls into and interposing the exemplary image between two pieces of captured image information, which generate the circular region.

After the step of picking up the exemplary image and arranging the exemplary image to be adjacent to the captured image information, the method of the present invention further comprises steps: undertaking subtraction of each pair of adjacent captured image positioning information in the motion path to generate distance information; while the distance information of two pieces of captured image positioning information is smaller than a geographic distance, the two pieces of captured image positioning information are ascribed into an identical local group; according to the captured image positioning information of the captured image information, selecting one piece of captured image information having the highest altitude from the identical local group, and adding a preset altitude value to the captured image positioning information to generate a threshold of Unmanned Aerial Vehicle (UAV) images; comparing the exemplary image positioning information of the exemplary images in the identical local group with the threshold of UAV images; while the exemplary image positioning information of an exemplary image is higher than the threshold of UAV images, arranging the exemplary image in the front of the sequence of the captured image information in the identical local group.

The information of identical local groups can be used to determine the positions where transition effects are added to the integrated video, wherein a transition effect is interposed between two different local groups to separate two different local groups during playing the integrated video.

Below, embodiments are described in detail to make easily understood the objectives, technical contents, characteristics and accomplishments of the present invention.

DETAILED DESCRIPTION OF THE INVENTION

Exempted from using graphic files of image data, the present invention can search the images of external devices, send back the images of the external devices, and automatically edit a personal video of images, merely using the text files of the image data, such as the positioning information, the photographing time and the image size.

Figure 1:
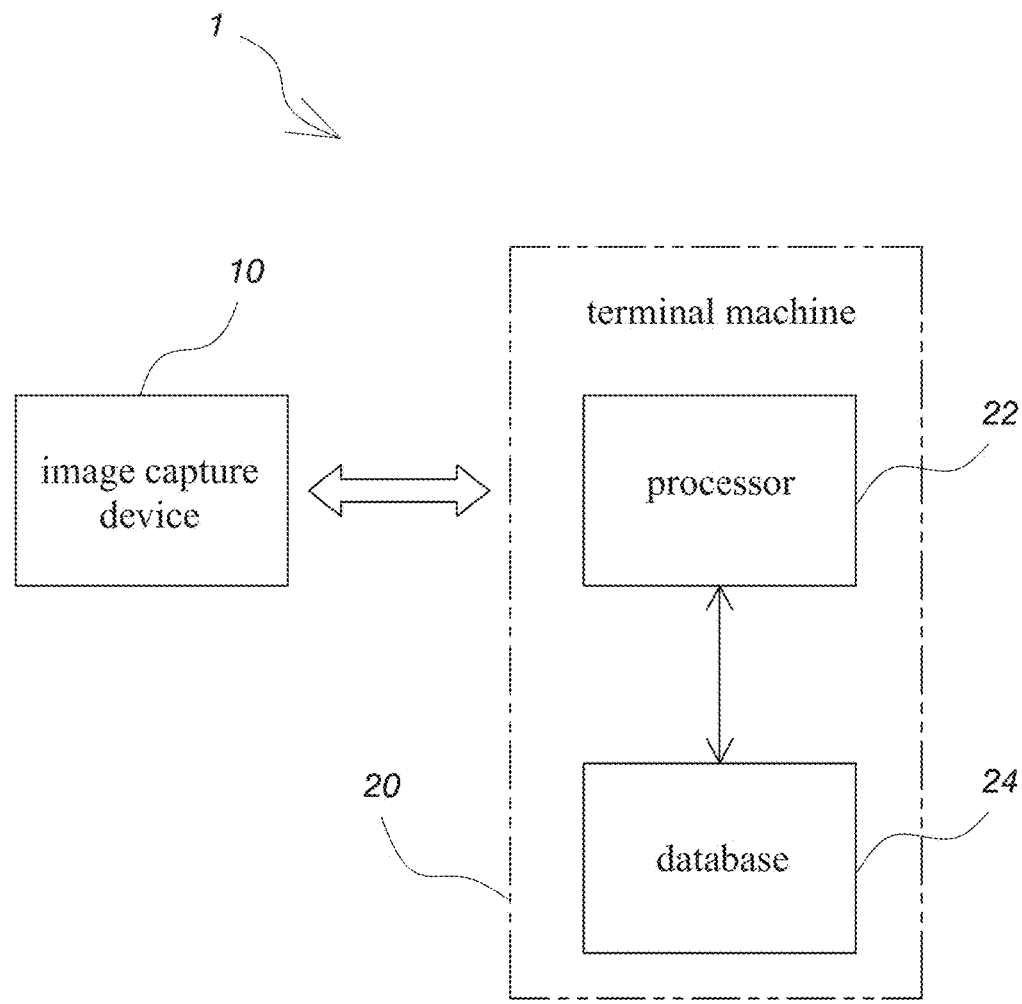
FIG. 1 is a block diagram schematically showing the system used by the present invention.

The fast image sequencing method of the present invention is computer program downloaded by an electronic device. Refer to FIG. 1 a block diagram schematically showing the system used by the present invention. The fast image sequencing system 1 comprises an image capture device 10 and a terminal machine 20. The terminal machine 20 includes a processor 22 and a database 24. The data transmission between the image capture 10 and the terminal machine 20 may be in a wireless or wired way. The image capture device 10 may be a computer having an image access function, a smart phone having a camera function, a smart tablet computer having a camera function, or an electronic device simultaneously having an image capture function and a computing function. In this embodiment, a smart phone is used to exemplify the image capture device 10. The captured images in the image capture device 10 may include captured image information, which is in the Exchangeable Image File Format (EXIF). The captured image information of the captured images includes captured image positioning information, captured image time information, and captured image size information. The captured image positioning information is calculated according to the signals provided by the Global Positioning System (GPS) or the Beidou Navigation Satellite System of PRC, including the coordinates of the longitude and latitude and the altitude. The captured image time information is the date and time of capturing an image. The captured image size information is the aspect ratio of an image, i.e. the height-to-width ratio. In this embodiment, the pixels of the captured image is used to determine the aspect ratio of the image. Alternatively, the aspect ratio is determined directly using the captured image size information.

Refer to FIG. 1 again. The terminal machine 20 may be a host computer, a cloud server, or an application server, which is a device able to perform a great amount of complicated computations. In this embodiment, a host computer is used to exemplify the terminal machine 20. The processor 22 of the terminal machine 20 can process data. The database 24 is used to store a plurality of exemplary images. In the embodiment, the images are videos or pictures. The exemplary images may be images captured by Unmanned Aerial Vehicles (UAV) time-lapse recordings, wide-angle panoramic images, beautiful pictures, post-production pictures, hand-drawn pictures, or highlights of concerts and sport events. Each exemplary image of the database 24 contains exemplary image information, which may be EXIF information or contents manually edited to meet EXIF format. The exemplary image information of the exemplary image includes exemplary image positioning information, exemplary image time information and exemplary image size information. The exemplary image positioning information is calculated according to the signals provided by the Global Positioning System (GPS) or the Beidou Navigation Satellite System of PRC, including the coordinates of the longitude and latitude and the altitude. The exemplary image time information is the date and time of capturing an image. The exemplary image size information is the aspect ratio of an exemplary image, i.e. the height-to-width ratio. In this embodiment, the pixels of the exemplary image is used to determine the aspect ratio of the image. Alternatively, the aspect ratio is determined directly using the exemplary image size information. The exemplary image may be a picture or video. However, a common video does not contain the positioning information having the EXIF information. In such a case, videos and pictures are unlikely to be sequenced. Thus, one of the pictures of the exemplary video is selected as a representative image, and positioning information is added to the representative image to function as the exemplary image positioning information of the exemplary image information.

Figure 2:
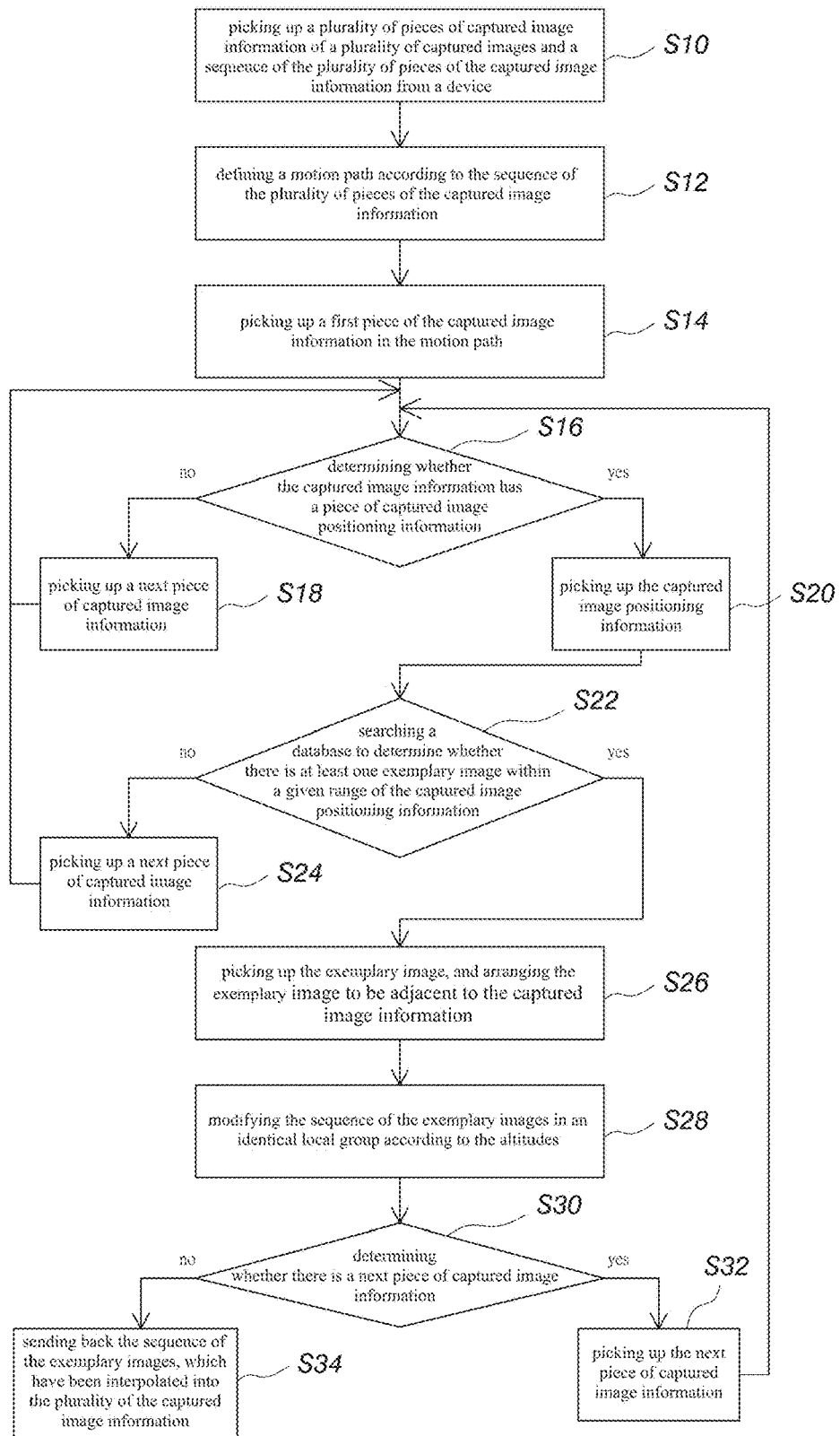
FIG. 2 is a flowchart of a fast image sequencing method according to one embodiment of the present invention.

The system used by the present invention has been described above, and the fast image sequencing method of the present invention will be described in detail below. Refer to FIG. 1 and FIG. 2. As shown in FIG. 2, the method of the present invention comprises Steps S10-S34. In Step S10, the image capture device 10 captures a plurality of images; the captured image information of the plurality of captured images, which is intended to be sequenced, and the sequence information of the captured images is transmitted to the terminal machine 20; the processor 22 of the terminal machine 20 receives the captured image information of the captured images and the sequence information of the captured images. The captured image information and the sequence information of the captured images, which the image capture device 10 transmits to the processor 22, is free of graphic information but only contains text information. Therefore, the transmitted file is smaller. Thus, less time is consumed in transmitting information, and the processing efficiency of the processor 22 is improved. Besides, the pictures of the captured images would not leak to other systems except the capture device 10.

Figure 3A:
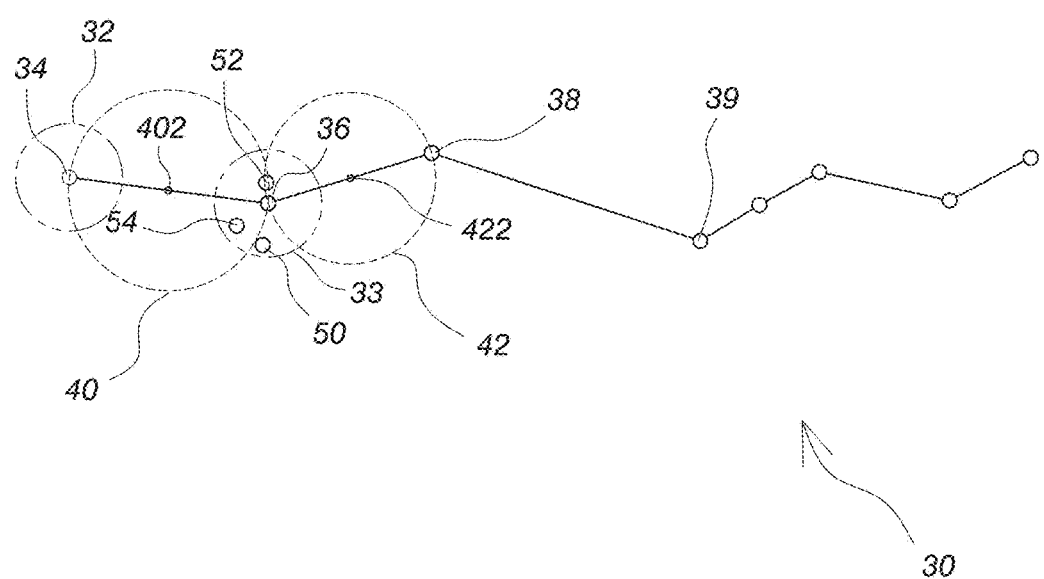
FIGS. 3A-3D are diagrams schematically showing motion paths according to one embodiment of the present invention.

Next, the process proceeds to Step S12. Refer to FIG. 3A. In Step S12, the processor 22 defines a motion path 30 according to the sequence information of the plurality of captured images. In the embodiment shown in FIG. 3A, the motion path 30 is from left to right. Therefore, the leftmost captured image information 34 is set to be the first piece of captured image information. Next, the process proceeds to Step S14. In Step S14, the processor 22 picks up the first piece of captured image information 34 in the motion path 30. Next, the process proceeds to Step S16. In Step S16, the processor 22 determines whether the captured image information contains a piece of captured image positioning information. If no, the process proceeds to Step S18. In Step S18, the processor 22 picks up the next piece of capture image information. Then, the process returns to Step S16 to determine whether the captured image information contains a piece of positioning information. If the determination in Step S16 is yes, the process proceeds to Step S20. In Step S20, the processor 22 picks up the captured image positioning information of the captured image. Next, the process proceeds to Step S22. In Step S22, according to the captured image positioning information of the first piece of capture image information 34, the processor 22 searches the database 24 to determine whether there is at least one exemplary image within a specified distance 32, such as 200 meters, from the first piece of capture image information 34. The specified distance may be set by the user according to the conscientiousness level of searching, and 200 meters is only an exemplary value of the specified distance. In detail, the processor 22 determines whether there is at least one exemplary image within a specified distance from the first piece of capture image information 34, according to the captured image positioning information of the captured image information 34 and the exemplary image positioning information of the exemplary image information. If the determination in Step S22 is no, it means that no exemplary image is found within the specified distance from the first piece of captured image information 34. Then, the process proceeds to Step S24. In Step S24, the processor 22 picks up the next piece of captured image information 36. Then, the process returns to Step S16 to determine whether the next piece of captured image information 36 contains a piece of captured image positioning information. If the determination in Step S22 is yes, it means at least one exemplary image is found within the specified distance 32. Next, the process proceeds to Step S26. In Step S26, the processor 22 picks up at least one exemplary image meeting the condition and arranges the exemplary image to be adjacent to the captured image information.

Refer to FIG. 2 and FIG. 3A again. In the embodiment shown in FIG. 2, while the processor 22 does not find the captured image positioning information of the first piece of captured image information 34 in Step S16, the processor 22 undertakes Step S18 to pick up the second piece of captured image information 36. Then, the processor 22 undertakes Step S16 again to determine whether the second piece of captured image information 36 has a piece of captured image positioning information. In the embodiment shown in FIG. 3A, the processor 22 determines that the second piece of captured image information 36 has a piece of captured image positioning information. Then, the processor 22 undertakes Step S20 to pick up the captured image positioning information of the second piece of captured image information 36. Then, the processor 22 undertakes Step S22 to determine whether there is at least one exemplary image within a specified distance from the second piece of captured image information 36. In the embodiment shown in FIG. 3A, the processor 22 finds three exemplary images 50, 52 and 54. Then, the processor 22 directly undertakes Step S26 to pick up the exemplary images 50, 52 and 54, which meet the condition, and arranges the exemplary images 50, 52 and 54 to be adjacent to the captured image information 36.

Refer to FIG. 1, FIG. 2, FIGS. 3A-3D, and FIG. 4. In Step S26, after picking up the exemplary images 50, 52 and 54, which meet the condition, the processor 22 determines whether the exemplary images 50, 52 and 54 match the photographing time and image size of the second piece of captured image information 36. In detail, the processor 22 undertakes Step S261 to compare the exemplary image time information of the exemplary images 50, 52 and 54 with the captured image time information of the captured image information to pick up the exemplary images within a specified interval from the captured image time information of the second piece of captured image information 36. For a common sightseeing spot, the user may use the preference setting function to make the processor 22 find out the exemplary images captured within 30 days from the captured image time information of the second piece of captured image information 36 so that the scenery of the exemplary images would not differ from the scenery of the second piece of captured image information 36 too much. For the highlights of a concert or a sporting event, the user may use the preference setting function to make the processor 22 find out the exemplary images captured within 1 minute from the captured image time information of the second piece of captured image information 36 so that the selected exemplary images are captured at time points very near the photographing time of the second piece of captured image information 36. The abovementioned 1 minute is only an exemplary value, and the user may adopt another value optionally. After selecting the exemplary images 50, 52 and 54, the processor undertakes Step S262 to compare the exemplary image size information with the captured image size information to select the exemplary images whose sizes meet the captured image size information of the second piece of captured image information 36. The user may determine whether to turn off the size screening function according to the conscientiousness level of searching.

After the exemplary images 50, 52 and 54 have been selected according to the positioning information, the time information and the size information, the processor 22 uses the coordinates of the longitudes and latitudes of the exemplary image positioning information of the exemplary images 50, 52 and 54 and the captured image positioning information of the captured image information to arrange the images in sequence. Refer to FIG. 3A. The distance between each piece of positioning information of captured image and the next piece of positioning information of captured image is used as the diameter, and the middle point of each piece of positioning information of captured image and the next piece of positioning information of captured image is used as the circle center, whereby to generate a plurality of circular regions. For example, a circular region 40 is generated between the captured image information 34 and the next captured image information 36; a circular region 42 is generated between the captured image information 36 and the next captured image information 38. Refer to Step S263 and FIG. 3A. Next is described in detail how to arrange the images in sequence according to the coordinates of the longitudes and latitudes of the exemplary image positioning information and the captured image positioning information. In Step S263, after picking up the exemplary images 50, 52 and 54, the processor 22 determine whether the exemplary image 50, 52 or 54 falls into the circular region 40 or 42 according to the exemplary image positioning information of the exemplary images 50, 52 and 54. If one exemplary image, such as the exemplary image 50, does not fall into any one of the circular regions 40 and 42, the processor 22 undertakes Step S264. In Step S264, the processor 22 selects the circular region 40, which the exemplary image 50 is most near, and interposes the exemplary image 50 between two pieces of captured image information 34 and 36, which are most near the circular regions 40. Then, the process proceeds to Step S28. If there is an exemplary image, such as the exemplary image 52 or 54, falling into the circular region 40, the processor 22 undertakes Step S265. In Step S265, the processor 22 determines whether the exemplary image 52 or 54 falls into another circular region 42 at the same time. If an exemplary image, such as the exemplary image 52, falls into two circular regions 40 and 42, the processor 22 undertakes Step S266. In Step S266, the processor 22 selects the circular region 42 whose center 422 is most near the exemplary image 52 and interposes the exemplary image 52 between two pieces of captured image information 36 and 38, which generate the circular region 42. Then, the process proceeds to Step S28. If an exemplary image, such as the exemplary image 54, falls into only the circular region 40, the processor 22 undertakes Step S267. In Step S267, the processor 22 selects the circular region 40, which the exemplary image 54 falls into, and interposes the exemplary image 54 between two pieces of captured image information 34 and 36, which generate the circular region 40. Then, the process proceeds to Step S28.

Figure 3B:
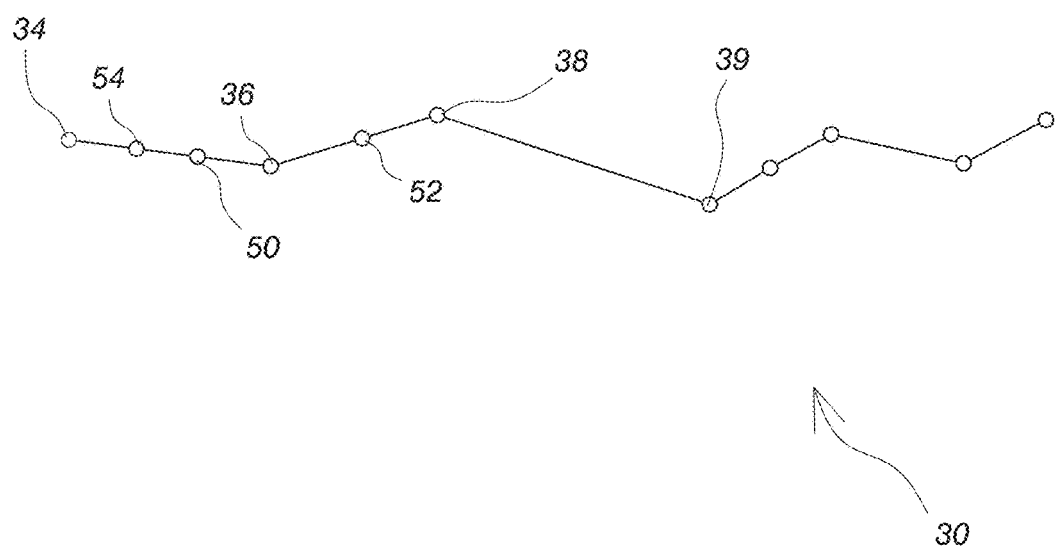
Figure 3C:
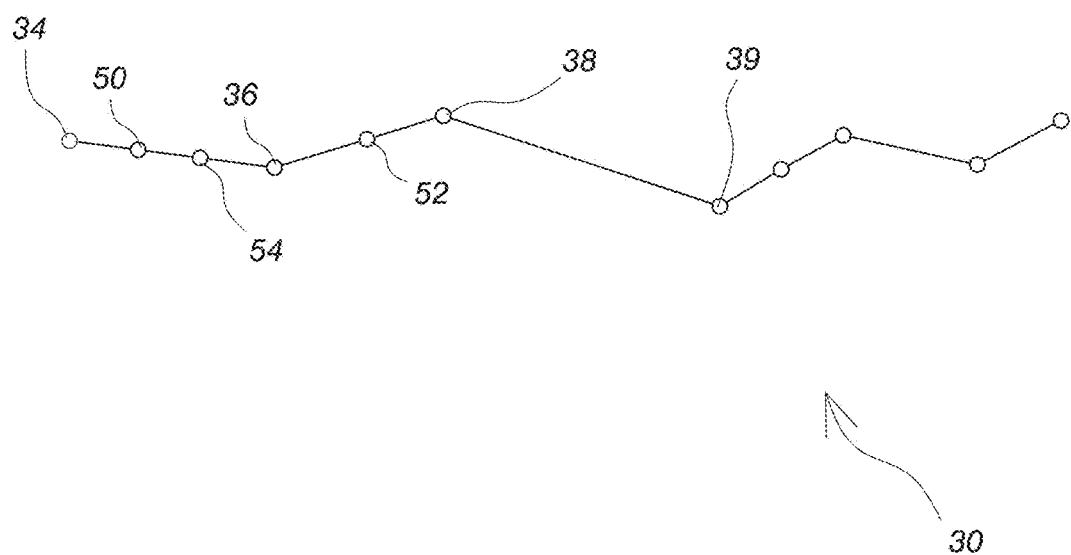
Figure 3D:
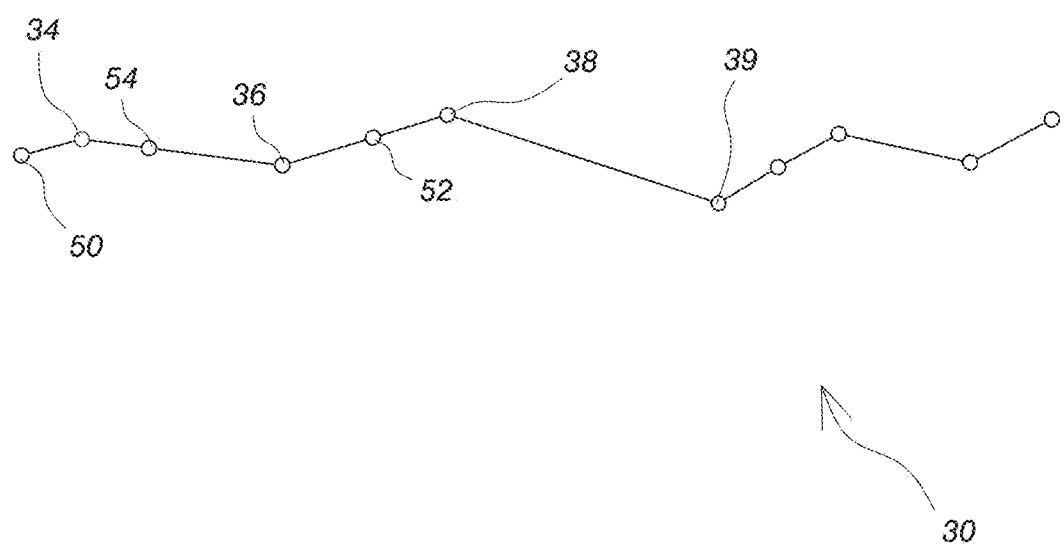
Figure 4:
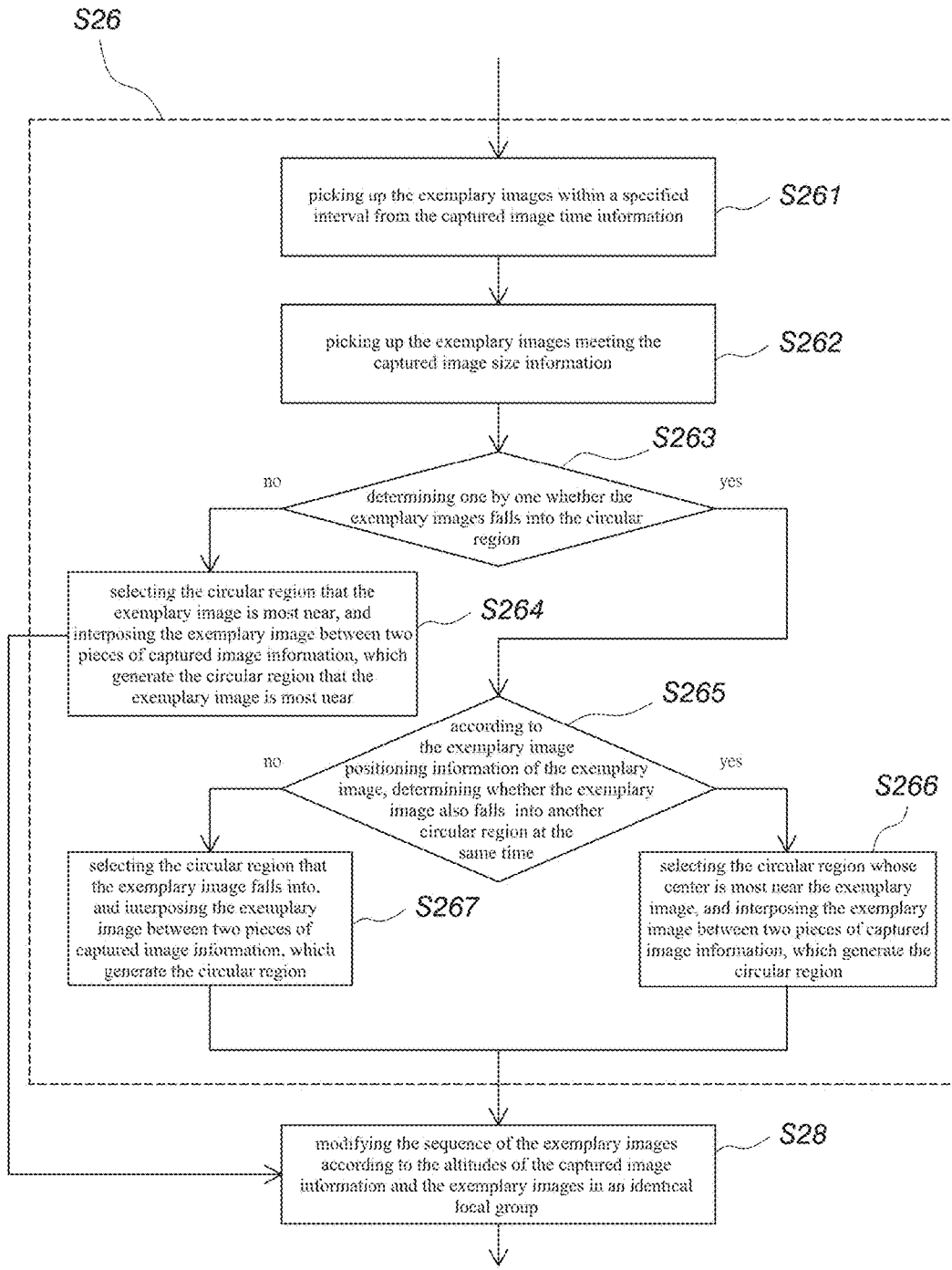
FIG. 4 is a flowchart of the details of selecting exemplary images according to one embodiment of the present invention.

FIG. 3B and FIG. 3C show the results of arranging the exemplary images 50, 52 and 54 according to Steps S263-S267. After the exemplary images 50, 52 and 54 are arranged according to the longitude and latitude, the processor 22 undertakes Step S28. In Step S28, the processor 22 further sequences the exemplary images 50, 52 and 54 and the captured image information according to the altitudes of the exemplary image positioning information and the captured image positioning information. In detail, along the motion path 30, the processor 22 undertakes the subtraction of the captured image positioning information of each pair of adjacent captured image information to generate distance information. While the distance information is smaller than a geographic distance, the pair of captured image information is ascribed to an identical local group. Refer to FIG. 3A again. For example, the processor 22 undertakes the subtraction of the captured image positioning information of the captured image information 36 and the captured image information 34 to generate a piece of distance information. Then, the processor 22 determines whether the distance information is smaller than a preset geographic distance. If the distance information is smaller than the geographic distance, the captured image information 36 and the captured image information 34 are ascribed to an identical local group. In the embodiment shown in FIG. 3A, the distance between the captured image positioning information of the captured image information 36 and the captured image information 34 is smaller than a geographic distance; the distance between the captured image positioning information of the captured image information 38 and the captured image information 36 is also smaller than a geographic distance. The user may set the value of the geographic distance arbitrarily. As the scenes of an open field are similar, the preset geographic distance in an open field is normally larger than or equal to the preset geographic distance in downtown streets. For example, the preset geographic distance in the Grand Canyon National Park of Arizona is set to be 1000 meters, but a geographic distance of 500 meter is sufficient for the downtown of San Francisco Calif. The distance between the captured image positioning information of the captured image information 39 and the captured image information 38 is larger than a geographic distance. Therefore, the captured image information 34, the captured image information 36 and the captured image information 38 belong to the same local group; the captured image information 39 does not belong to the local group of the captured image information 34, 36 and 38. Next, the processor 22 find out the highest altitude from the captured image positioning information of the captured image information 34, 36 and 38 and adds a preset altitude value, such as 6 meters, to the highest altitude to the highest altitude to function as the threshold of the UAV (Unmanned Aerial Vehicle) images of the local group. The reason why 6 meters is used as the preset altitude value is that 6 meters is equal to the height of a person (about 2 meters) plus the height of a selfie stick (1 meter) and plus the measurement error of the measuring device (3 meters). However, 6 meters is only an exemplary value of the preset altitude. The user may adopt another value optionally. Next, the processor 22 compares the altitudes of the exemplary image positioning information of the exemplary images 50, 52 and 54 with the UAV image threshold. If none of the altitudes of the exemplary image positioning information is higher than the UAV image threshold, the processor 22 maintains the sequence of the exemplary images and the captured image information in the local group. The result of sequencing is still that shown in FIG. 3B or FIG. 3C. In the motion path 30, the sequence is 34→54→50→36→52→38→39 or 34→50→54→36→52→38→39, from left to right. If only the altitude of the exemplary image positioning information of the exemplary image 50 is higher than the UAV image threshold, the processor 22 will slightly modify the sequence and moves the exemplary image 50 to the front of the sequence of the exemplary images and the captured image information in the local group, as shown in FIG. 3D. In the motion path 30 shown in FIG. 3D, the sequence is 50→34→54→36→52→38→39 from left to right. It can be learned from the abovementioned sequences: the images 50, 34, 54, 36, 52, and 38 belong to the same local group, and the image 39 belongs to another local group. The images are integrated into a video according to the abovementioned sequence. A transition effect may be added to the video and interposed between the images 50, 34, 54, 36, 52, and 38 and the image 39. While the video is played, the transition effect can separate images of different local groups.

Figure 5A:
FIGS. 5A-5C are diagrams schematically showing the interface of an image capture device used by the present invention.
Figure 5B:
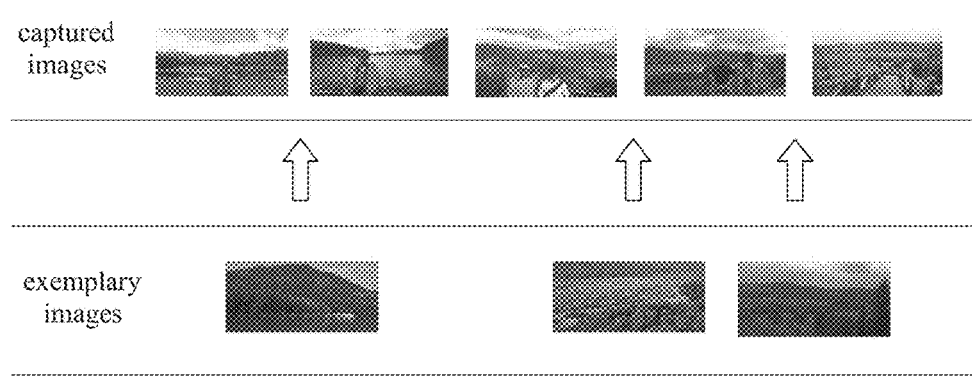
Figure 5C:
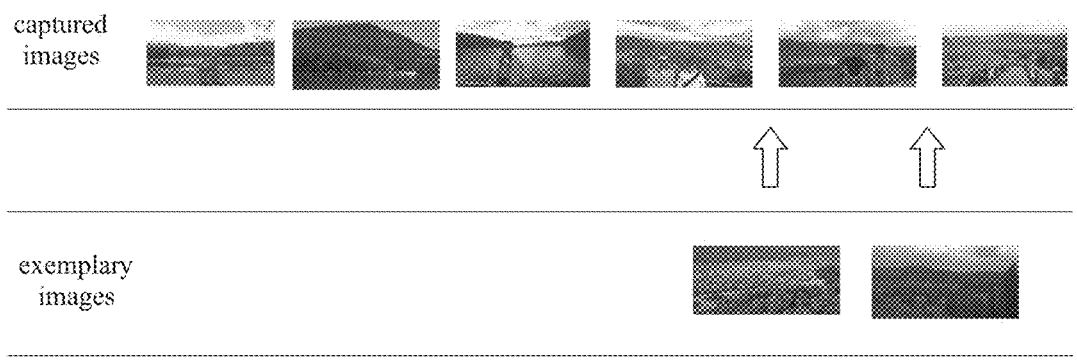

After sequencing the images according to altitudes, the processor 22 undertakes Step S30 to determine whether there is a next piece of captured image information. If yes, the processor 22 undertakes Step S32 to pick up the next piece of captured image information and then returns to Step S16 to pick up, compare and sequence the exemplary images again. If the processor 22 does not find a next piece of captured image information, the process proceeds to Step S34. Refer to FIGS. 5A-5C. In Step S34, the processor 22 transmits the sequenced exemplary images and the sequence information of the captured image information to the image capture device 10 to make the image capture 10 also show the exemplary images in addition to the captured images, wherein the exemplary images are arranged in the periphery, such as the bottom, of the captured images and corresponding to the original sequence, whereby the user can operate the image capture device 10 to determine whether to adopt the selected exemplary images. If yes, the user directly interposes the exemplary images into the sequence of the plurality of captured images according to the original order to form an image sequence. Then, the adopted exemplary images and the original captured images are output to form an integrated video.

Refer to FIG. 1 and FIGS. 5A-5C that show the operating interfaces the user sees. Firstly refer to FIG. 1 and FIG. 5A. While the user operates the image capture device 10, he selects the sequence of the captured images he intends to make into a video on the user interface. Then, the user transmits the captured image information and the sequence information of the captured images to the processor 22 of the terminal machine 20. Next refer to FIG. 5B. Then, the processor 22 finds out the exemplary images according to the method of the present invention, sends the exemplary images to the image capture device 10 held by the user, and arranges the exemplary images on the bottom corresponding to the captured images according to the abovementioned sequence. Thereby, the user may determine whether to adopt the sequence. If the user adopts the sequence, he directly interposes the sequence into the sequence of the original captured images. Next refer to FIG. 5C. The user selects one exemplary image, interposes the exemplary image between the captured images, and uses the sequence to output an integrated video. The operating interface of the image capture device 10 may provide a click-on function or a slide function for the user to click on or slide the exemplary images, whereby the operating interface can present more exemplary images meeting the screening condition to the user for selection.

In one embodiment, the computer program of the fast image sequencing method of the present invention may be directly loaded into the processor of the image capture device 10; the processor of the image capture device 10 searches external database for exemplary images and downloads the exemplary images; the exemplary images are sequenced in the processor of the image device 10; then, the exemplary images meeting the condition are directly shown on the display screen of the image capture device 10. In the abovementioned embodiments, the image capture device 10 transmits the captured image information to the terminal machine 20, and the terminal machine 20 undertakes the searching and sequencing of exemplary images. However, these embodiments are only to exemplify the present invention. The scope of the present invention is not limited by these embodiments.

In conclusion, the present invention proposes a_fast image sequencing method, which can use merely the EXIF information to sequence images without using the graphic data, and which can automatically search for related images to enrich the personally-made video, whereby the present invention can effectively exempt the user from complicated image edition and save the user a lot of time. As the file size of the EXIF information is smaller, the time of sequencing and editing images can be decreased. Besides, adoption of EXIF information can prevent the personal images from leakage. Further, the present can use the positioning information of the EXIF information to automatically select the images corresponding to the site and time of the EXIF information and interpose the selected images into the sequence of the captured images to enrich the contents of the video.

The embodiments described above are only to exemplify the present invention but not to limit the scope of the present invention. Any equivalent modification or variation according to the characteristics or spirit of the present invention is to be also included by the present invention.

What is claimed is:

1. A fast image sequencing method comprising steps:
  (A) picking up a plurality of pieces of captured image information of a plurality of captured images and a piece of sequence information of said captured image information from a device;
  (B) defining a motion path according to said sequence information of said captured image information;
  (C) picking up a first piece of said captured image information in said motion path;
  (D) determining whether said captured image information has a piece of captured image positioning information;
    (D1) if no, picking up a next piece of captured image information, and returning to said Step (D);
    (D2) if yes, picking up said piece of captured image positioning information, and proceeding to Step (E);
  (E) searching a database to determine whether there is at least one exemplary image within a specified distance from said piece of captured image positioning information, wherein said exemplary image includes a piece of exemplary image information, and wherein said piece of exemplary image information includes a piece of exemplary image positioning information;
    (E1) if no, picking up a next piece of captured image information, and returning to said Step (D);
    (E2) if yes, picking up said exemplary image, and arranging said exemplary image to be adjacent to said captured image information, and then proceeding to Step (F); and
  (F) determining whether there is a next piece of captured image information;
    (F1) if yes, picking up said next piece of captured image information, and returning to Step (D);
    (F2) if no, sending back sequence information of said exemplary images, which have been added to said sequence information of said captured image information, to said device.

2. The fast image sequencing method according to claim 1, wherein each of the plurality of pieces of said captured image information includes a piece of captured image time information; said exemplary image information includes a piece of exemplary image time information; said Step (E2) is followed by Step (E21): comparing said exemplary image time information and said captured image time information, and picking up said exemplary images within a specified interval from said captured image time information.

3. The fast image sequencing method according to claim 1, wherein each of the plurality of pieces of said captured image information includes a piece of captured image size information; said exemplary image information includes a piece of exemplary image size information; said Step (E2) is followed by Step (E22): comparing said exemplary image size information with said captured image size information, and picking up said exemplary images matching said capture image size information.

4. The fast image sequencing method according to claim 1, wherein said Step (E2) is further followed by Step (E23) including steps:
 (E231) according to said exemplary image positioning information of said exemplary images, determining one by one whether said exemplary images fall into a circular region whose diameter is a distance between one piece of said captured image positioning information and a next piece of said captured image positioning information;
  if no, selecting one said circular region most near said exemplary image, and interposing said exemplary image between two pieces of said captured image positioning information most near said circular region, and then proceeding to said Step (F);
  if yes, proceeding to Step (E232); and
 (E232) according to said exemplary image positioning information of said exemplary image, determining whether said exemplary image also falls into another circular region at the same time;
  if yes, selecting one said circular region whose center is most near said exemplary image, interposing said exemplary image between two pieces of said captured image positioning information, which generate said circular region, and then proceeding to Step (F);
  if no, selecting said circular region said exemplary image falls into, interposing said exemplary image between two pieces of said captured image positioning information, which generate said circular region, and then proceeding to Step (F).

5. The fast image sequencing method according to claim 1 further comprising Step (E24) after said Step (E2) of picking up said piece of exemplary image and arranging said piece of exemplary image to be adjacent to said captured image information, wherein said Step (E24) includes steps:
 (E241) undertaking subtraction of said captured image positioning information of each two adjacent pieces of said captured image information to generate a piece of distance information, and ascribing said two adjacent pieces of said captured image information into an identical local group if said distance information is smaller than a geographic distance;
 (E242) according to said captured image positioning information of said captured image information, selecting one said captured image information having a highest altitude in said identical local group, and adding a preset altitude value to said captured image positioning information to generate a threshold of Unmanned Aerial Vehicle (UAV) images;
 (E243) comparing said exemplary image positioning information of said exemplary images inside said identical local group with said threshold of UAV images; if said exemplary image positioning information of said exemplary image is higher than said threshold of UAV images, arranging said exemplary image in a front of said sequence information of said captured image information inside said identical local group.

6. The fast image sequencing method according to claim 1, wherein after said Step (F2), a display interface of said device shows said exemplary images in a periphery of said captured images; a user selects said exemplary images from said display interface and interpolates said exemplary images into corresponding said captured images.

7. The fast image sequencing method according to claim 6, wherein a region where said exemplary images are shown on said display interface of said device can be clicked on or slid to present more said exemplary images meeting a searching condition.

8. The fast image sequencing method according to claim 1, which is realized by a computer program downloaded through an electronic device.

9. The fast image sequencing method according to claim 1, wherein while said exemplary image is a video, an image of said video is selected as a representative picture; positioning information of said representative picture is set to be said exemplary image positioning information of said exemplary image.

10. The fast image sequencing method according to claim 6, wherein selected said exemplary images are interpolated into corresponding said captured images to generate an integrated video.

11. The fast image sequencing method according to claim 5, wherein said Step (F2) is followed by a step: a display interface of said device shows said exemplary images in a periphery of said captured images, and a user selects said exemplary images from said display interface and interpolates said exemplary images into corresponding said captured images to generate an integrated video, and wherein transition effects are interposed into different said local groups of said integrated video.

* * * * *